Feb. 3, 1959     C. H. MOTZ     2,872,198
WORK HOLDER
Filed May 20, 1957
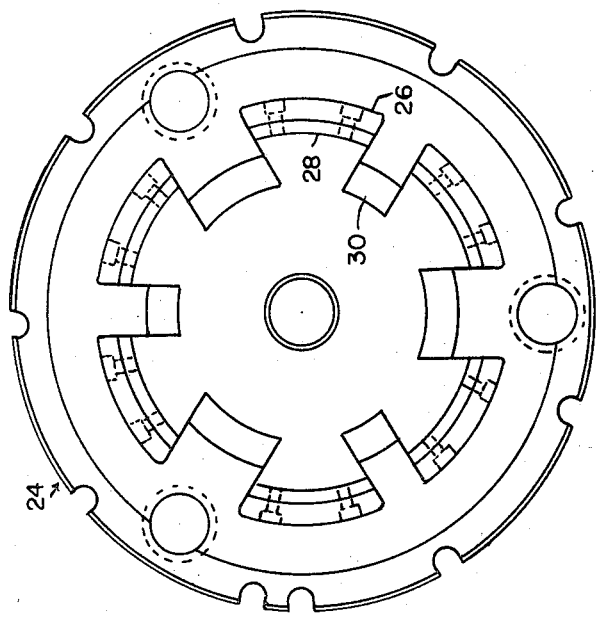
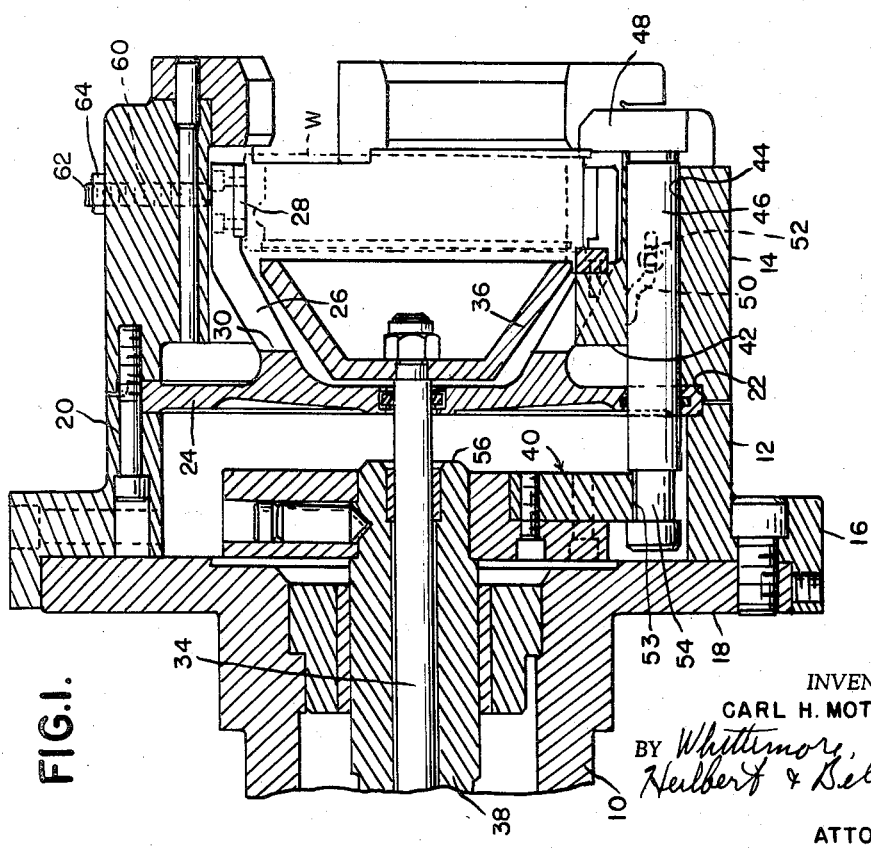
INVENTOR.
CARL H. MOTZ
ATTORNEYS

United States Patent Office 2,872,198
Patented Feb. 3, 1959

2,872,198

WORK HOLDER

Carl H. Motz, East Detroit, Mich., assignor to National Broach & Machine Company, Detroit, Mich., a corporation of Michigan Application May 20, 1957, Serial No. 660,273

3 Claims. (Cl. 279—46)

The present invention relates to a work holder and more particularly, to a work holder including a diaphragm chuck.

It is an object of the present invention to provide a work holder including a diaphragm chuck having radially movable clamping jaws, in combination with means to limit radial movement of a work piece gripped thereby when subjected to substantial radial loading.

More particularly, it is an object of the present invention to provide a diaphragm chuck including a diaphragm having arms extending from one side thereof, the end portions of which are movable radially upon flexing of the diaphragm, in combination with abutment means associated with each of said arms to limit radial movement of a work piece held by said arms.

Other objects and features of the invention will become apparent as the description proceeds, especially when taken in conjunction with the accompanying drawing, illustrated a preferred embodiment of the invention, wherein:

Figure 1 is a longitudinal sectional view through a work support constructed in accordance with the present invention.

Figure 2 is an elevational view of the diaphragm.

The work support is illustrated as associated with a rotary arbor 10 having a housing comprising annular housing members 12 and 14 carried thereby. The member 12 has a rearwardly extending flange 16 surrounding the radially outwardly extending flange 18 on the arbor. The housing members 12 and 14 are rigidly interconnected by suitable means such as the screws 20 and have cooperating inwardly facing seat portions 22 which receive the periphery of a diaphragm 24. The diaphragm 24 has a plurality of forwardly extending arms or jaws 26 which as best seen in Figure 2 are six in number and which have arcuate facing plates 28 screwed or otherwise secured to the inner side of the free ends thereof to engage the outer surface of a work piece indicated at W.

The material between adjacent arms or jaws 26 is removed, leaving flat radial surfaces 30 which are identified in both Figures 1 and 2 for ready comparison. Movable longitudinally of the arbor 10 is an ejector rod 34 which at its inner end carries a cup-shaped head 36 the edge of which is engageable with the inner side of the work piece W to eject the work piece in properly timed relation to its release by the chuck.

Also, longitudinally movable of the arbor 10 is a drawbar 38 which at its end has an annular head construction 40 secured thereto. The housing member 14 has radially inwardly extending portions 42 provided with openings 44 which receive rotatable and longitudinally slidable pins 46 the outer ends of which have laterally extending work engaging clamp elements 48. The pins 46 have slots 50 therein including straight and inclined portions, the slots receiving fixed guide pins 52 carried by the housing member 14. The head construction 40 secured to the drawbar 38 includes peripheral recesses 53 engageable with reduced portions 54 of the pins 46.

As the drawbar 38 is moved to the right as seen in the figure, the pins 46 are first moved to the right to release the work piece W and are then rotated an amount sufficient to move the work engaging clamp elements 48 into clearance position.

It will also be observed that the end of the drawbar 38 includes an annular abutment surface 56 which engages with the central portion of the diaphragm 24 as the drawbar 38 reaches its limiting position to the right, as viewed in the figure. The force thus applied to the diaphragm flexes it in such a way as to cause the free ends of the arms or jaws 26 to move outwardly, thus releasing the work piece W. Thereafter, the ejector rod 34 is moved to the right, pushing the finished work piece out of the work support.

The diaphragm 24 of the diaphragm chuck is of course resilient so that when a work piece is positioned between the free ends of its jaws or arms and its diaphragm permitted to resume its normal shape, the resilience of the diaphragm moves the arms or jaws radially inwardly to engage the work with a very substantial force.

While the work piece is thus gripped at a plurality of equal angularly spaced positions by jaw members, the radial forces exerted by these jaw members are all counterbalanced. Thus, relatively small radial forces applied to the work piece has the effect of causing radial deflection of the work piece.

In accordance with the present invention the housing member 14 is provided with a plurality of threaded screws 62 the inner end of each of which is in alignment with one of the outer ends of the jaws or arms 26. The abutment screws 62 are adjustable into the required clearance position and are retained thereat by lock nuts 64.

It will be appreciated that the jaws 26 are required to move radially outwardly only an extremely short distance to effect release of the work piece W and the radial outward movement of the arms when the diaphragm 24 is released, will be controlled by the adjustment of the abutment screws 62. Accordingly, when the diaphragm chuck is actuated to clamp the work piece, there will be a correspondingly small radial inward movement of the free ends of the arms or jaws 26, this movement determining the operating clearance which exists during a subsequent operation between the inner ends of the abutment screws 62 and the outer ends of the arms 26.

A typical application of the present invention is to a machine for finishing internal gears, in which the work piece W may be in the form of a gear having internal teeth engaged during the machining operation by the external teeth of a tool or cutter. The force thus applied to the work piece during the machining operation is a radial force acting in a definite direction which is unchanged as the work piece and tool are rotated in mesh. Due to the rotation of the work piece, and due to the fact that it is continuously urged radially in a specific direction, the operation will be carried out in such a way that the work piece rotates in a substantially fixed position displaced slightly from the axis of the arbor 10. This displacement is of negligible amount and is constant during the machining operation so that no measurable errors are introduced into the finished work piece.

Although the clamping elements 48 engage the outer end of the work piece, nevertheless a substantial part of the support of the work piece is dependent on the jaws of the diaphragm chuck.

The drawing and the foregoing specification constitute a description of the improved work holder in such full, clear, concise and exact terms as to enable any person

What I claim as my invention is:

1. A work support comprising a diaphragm having a plurality of work gripping arms extending from adjacent the edge at one side thereof, said arms being adapted to grip a work piece in operation and to provide a substantial support therefor, the free ends of said arms being movable radially upon flexing of said diaphragm, a support for said diaphragm including a rigid portion disposed radially outwardly from the free ends of said arms, and abutments carried by said rigid portion engageable by said arms to limit radial outward movement thereof in response to radial loading of a work piece carried by said arms.

2. A work support comprising a diaphragm having a plurality of work gripping arms extending from adjacent the edge at one side thereof, said arms being adapted to grip a work piece in operation and to provide a substantial support therefor, the free ends of said arms being movable radially upon flexing of said diaphragm, a support for said diaphragm including a rigid portion disposed radially outwardly from the free ends of said arms, and adjustable abutments carried by said rigid portion engageable by said arms to limit radial outward movement thereof in response to radial loading of a work piece carried by said arms.

3. A work support comprising a diaphragm having at least three work gripping arms extending from adjacent the edge at one side thereof, said arms being adapted to grip a work piece in operation and to provide a substantial support therefor, the free ends of said arms being movable radially upon flexing of said diaphragm, a support for said diaphragm including a rigid portion disposed radially outwardly from the free ends of said arms, and abutments carried by said rigid portion engageable by said arms to limit radial outward movement thereof in response to radial loading of a work piece carried by said arms.

References Cited in the file of this patent

UNITED STATES PATENTS

| | | |
|---|---|---|
| 1,881,905 | Page et al. | Oct. 11, 1932 |
| 2,389,366 | Jones | Nov. 20, 1945 |
| 2,538,289 | Armes | Jan. 16, 1951 |